US009170995B1

(12) United States Patent
Bauman et al.

(10) Patent No.: US 9,170,995 B1
(45) Date of Patent: Oct. 27, 2015

(54) IDENTIFYING CONTEXT OF CONTENT ITEMS

(75) Inventors: Shannon P. Bauman, Chapel Hill, NC (US); Leslie Chiang, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 327 days.

(21) Appl. No.: 12/407,379

(22) Filed: Mar. 19, 2009

(51) Int. Cl.
*G06F 17/30* (2006.01)
(52) U.S. Cl.
CPC ....................... *G06F 17/30* (2013.01)
(58) Field of Classification Search
CPC .......... G06F 3/04812; G06F 17/30705; G06F 17/212; G06F 17/30017; G06F 17/30598; G06F 3/04842; G06F 17/30; G06F 17/3053; G06F 17/3064; G06F 17/30867; G06F 17/30876; G06F 17/30994
See application file for complete search history.

(56) References Cited

U.S. PATENT DOCUMENTS

| 6,907,581 | B2 | 6/2005 | Noy et al. |
| 7,007,074 | B2* | 2/2006 | Radwin ........................... 709/217 |
| 7,054,900 | B1* | 5/2006 | Goldston ....................... 709/203 |
| 7,133,839 | B2 | 11/2006 | Inoue et al. |
| 2003/0050863 | A1* | 3/2003 | Radwin ........................... 705/27 |
| 2004/0059708 | A1 | 3/2004 | Dean et al. |
| 2004/0078292 | A1 | 4/2004 | Blumenau |
| 2004/0093327 | A1 | 5/2004 | Anderson et al. |
| 2004/0186620 | A1 | 9/2004 | Chirnomas |
| 2005/0154608 | A1 | 7/2005 | Paulson et al. |
| 2005/0240580 | A1 | 10/2005 | Zamir et al. |
| 2006/0026071 | A1* | 2/2006 | Radwin ........................... 705/14 |
| 2006/0248209 | A1 | 11/2006 | Chiu et al. |
| 2007/0027864 | A1* | 2/2007 | Collins et al. ..................... 707/5 |
| 2007/0033531 | A1* | 2/2007 | Marsh ........................... 715/738 |
| 2007/0078714 | A1 | 4/2007 | Ott et al. |
| 2007/0094363 | A1 | 4/2007 | Yruski et al. |
| 2007/0100689 | A1* | 5/2007 | Axe et al. ........................ 705/14 |
| 2007/0100695 | A1 | 5/2007 | Seet et al. |
| 2007/0112630 | A1* | 5/2007 | Lau et al. ........................ 705/14 |
| 2007/0157228 | A1 | 7/2007 | Bayer et al. |
| 2007/0192164 | A1 | 8/2007 | Nong et al. |
| 2007/0250901 | A1 | 10/2007 | McIntire et al. |
| 2007/0255702 | A1* | 11/2007 | Orme ................................. 707/5 |
| 2008/0059536 | A1 | 3/2008 | Brock et al. |
| 2008/0065620 | A1* | 3/2008 | Chopra ............................ 707/5 |
| 2008/0082405 | A1 | 4/2008 | Martinez et al. |
| 2008/0140591 | A1* | 6/2008 | Agarwal et al. .................. 706/12 |
| 2008/0163071 | A1* | 7/2008 | Abbott et al. ................. 715/748 |
| 2008/0172293 | A1* | 7/2008 | Raskin et al. .................... 705/14 |
| 2008/0208682 | A1 | 8/2008 | Chandley et al. |
| 2008/0228581 | A1* | 9/2008 | Yonezaki et al. ............... 705/14 |
| 2008/0256061 | A1* | 10/2008 | Chang et al. ..................... 707/5 |
| 2008/0270223 | A1* | 10/2008 | Collins et al. .................. 705/10 |

(Continued)

OTHER PUBLICATIONS

U.S. Appl. No. 12/407,354, filed Mar. 19, 2009, Bauman et al.

(Continued)

*Primary Examiner* — Angelica Ruiz
(74) *Attorney, Agent, or Firm* — Fish & Richardson P.C.

(57) ABSTRACT

Methods, systems, and apparatus, including computer program products, may be used for identifying context. Web attributes associated with a first instance of a content item displayed on a first web page may be identified along with a second web page displaying a second instance of the content item. Context information may be determined using the web attributes, and the context information may be associated with the second web page.

19 Claims, 11 Drawing Sheets

(56) References Cited

U.S. PATENT DOCUMENTS

| | | |
|---|---|---|
| 2008/0300974 A1 | 12/2008 | Bhandari et al. |
| 2009/0006375 A1* | 1/2009 | Lax et al. ........................ 707/5 |
| 2009/0089151 A1* | 4/2009 | Protheroe et al. ............ 705/10 |
| 2009/0125510 A1* | 5/2009 | Graham et al. ................. 707/5 |
| 2009/0138924 A1 | 5/2009 | Eastes |
| 2009/0171754 A1* | 7/2009 | Kane et al. ..................... 705/10 |
| 2009/0281884 A1* | 11/2009 | Selinger et al. ............. 705/14.4 |

OTHER PUBLICATIONS

U.S. Appl. No. 12/407,181, filed Mar. 19, 2009, Bauman et al.

U.S. Appl. No. 12/407,382, filed Mar. 19, 2009, Bauman et al.

Peters, Todd. "What You DON'T Know about Web Content Management." KM World 2005: S26-27. ProQuest. Web 22, Mar. 2013.

* cited by examiner

IDENTIFYING CONTEXT OF CONTENT ITEMS

CROSS-REFERENCE TO RELATED APPLICATIONS

This application is related to U.S. patent application Ser. No. 12/407,181, entitled "Controlling Content Items," U.S. patent application Ser. No. 12/407,354, entitled "Using Metadata Associated with Content Items," and U.S. patent application Ser. No. 12/407,382, entitled "Sharing Revenue Associated with A Content Item." All of these applications are to inventors Shannon P. Bauman and Leslie Chiang, are being filed concurrently with this application, and are incorporated by reference.

TECHNICAL FIELD

This specification relates to tagging and using content items.

BACKGROUND

The Internet provides access to a wide variety of content items, such as image, video and/or audio files, that may be related to wide variety of subjects. These content items are displayed on web pages across the Internet. Content items are often used on the web pages as a change from text and to make the web pages more appealing to users. Some web pages are entirely composed of content items without any text.

SUMMARY

In one general aspect, control of content items may be provided by using one or more computers to identify web attributes associated with a first instance of a content item displayed on a first web page; identify a second web page displaying a second instance of the content item; determine context information using the web attributes; and associate the context information for the first instance of the content item with the second instance of the content item.

Implementations may include one or more of the following features. For example, the context information may be associated with the second instance of the content item, and the second web page may not include text. The web attributes may include at least a URL associated with the first web page, content associated with the first web page, subject matter associated with the first web page, and subject matter associated with the first content item.

In another general aspect, control of content items may be provided by using one or more computers to identify web attributes associated with a first instance content item displayed on a first web page; identify a second web page displaying a second instance of the content item; receive a request for an advertisement to be displayed on the second web page; use the web attributes associated with the first instance of the content item displayed on the first web page in selecting an advertisement from a set of candidate advertisements; and provide the selected advertisement in response to the request.

Implementations may include one or more of the following features. For example, the selected candidate advertisement may be displayed on the second web page, and may be provided to a publisher associated with the second web page. Using the web attributes associated with the first instance of the content item displayed on the first web page in selecting a candidate advertisement from a set of candidate advertisements may include identifying keywords associated with each candidate advertisement in the set of candidate advertisements that match one or more of the web attributes, and selecting as the selected advertisement an advertisement from the set of candidate advertisements that is associated with the identified keywords. The set of candidate advertisements may be ranked based on a number of identified keywords associated with each candidate advertisement that match one or more of the web attributes, and the ranking may be used in selecting the advertisement from the set of candidate advertisements.

The details of one or more implementations are set forth in the accompanying drawings and the description below. Other features will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

In general, content items may be supplied with tags that include information associated with how the content items can be used by entities other than an owners of the content items. The tags may be used to track the content items in different environments, and to enforce use of the content items according to the information specified in the tags.

The content items can include multimedia objects. The multimedia objects can include one or a combination of audio, text, animation, video, still images, and interactive content. The tag applied to a content item can include metadata tags that contain information such as an identification of a subject of the content item or words describing the subject matter, as will be described in greater detail below.

Content items such as image and audio files can include metadata tags defined in an Exchangeable image file format (EXIF). EXIF is a specification for an image file format that is used by digital cameras. EXIF uses existing JPEG, TIFF, and RIFF WAV file formats and adds additional specific metadata tags. The metadata tags can include date and time information, camera settings such as the specific camera that was used to take a picture of an image, as well as ownership information, sharing level information, and cost-per-use information associated with the content item.

While the specification describes EXIF format for digital image and audio files, other standard formats such as the International Press Telecommunications Council (IPTC) and Adobe's eXtensible Metadata Platform (XMP) can also be used as the format for storing the metadata.

The metadata can be used to track the content item and to ensure entities other than the owner of the content item are using the content item according to the information specified in the metadata as described in greater detail below.

§1.1 Content Item Tracking and Use

Figure 1:
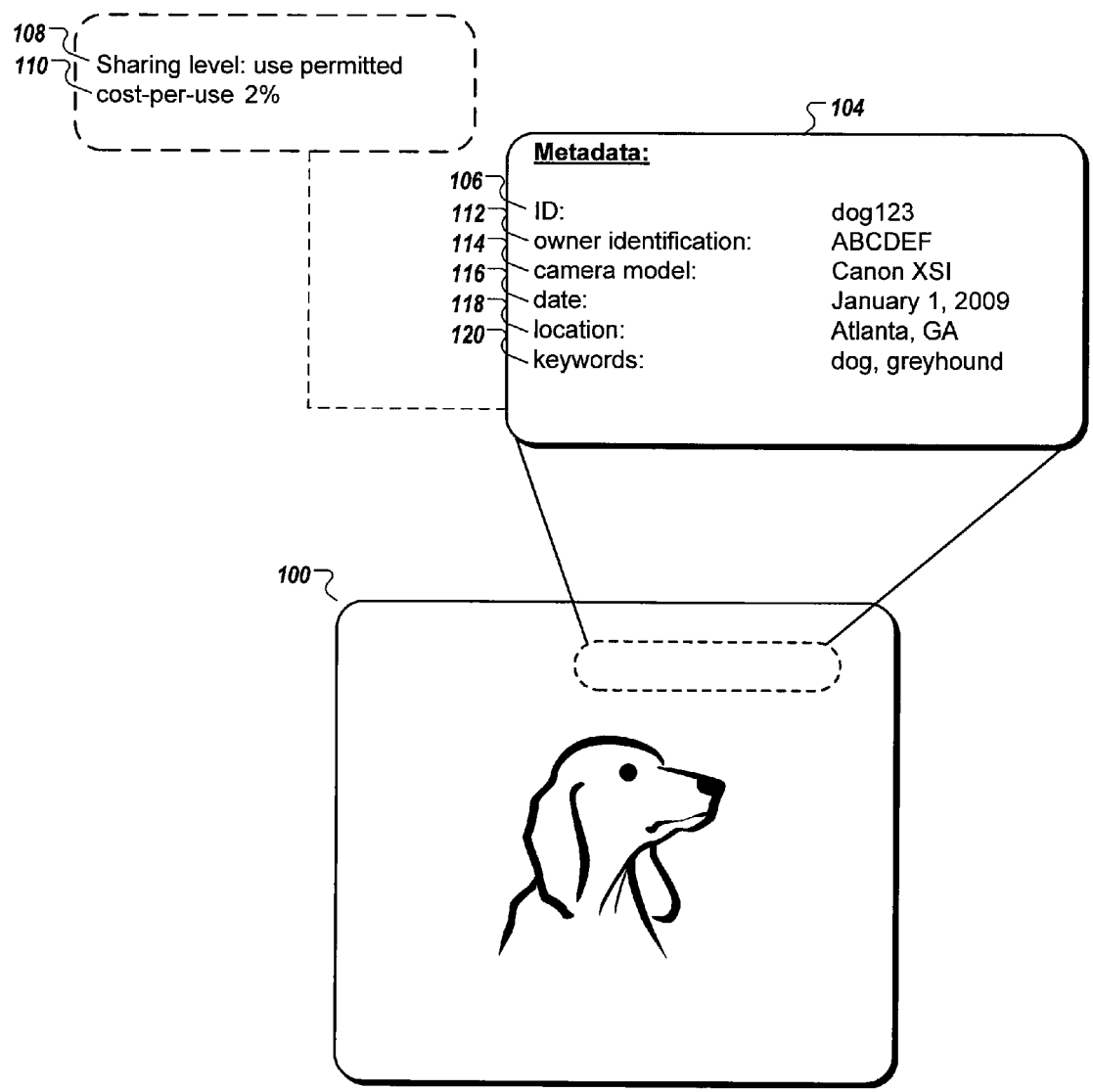
FIG. 1 is an example of a tagged content item.

FIG. 1 shows an example of a tagged content item 100. The content item 100 is a JPEG image file of a dog. The content item 100 includes metadata tags 104 including EXIF data that can, for example, be defined by an owner of the content item 100. The metadata tags 104 include an identification 106 of the content item "dog123" that is a specific identification for only the content item 100 as defined, for example, by the owner. The owner of content item 100 may be a photographer and may have taken the picture of a dog with a camera. The owner may then have defined all or parts of the metadata tags 104, such as the identification 106 "dog123" or other metadata described below.

The content item 100 can be associated with a sharing level 108 and a cost-per-use amount 110. In one implementation, the sharing level 108 and the cost-per-use amount 110 are stored separately from the metadata 104 in a database and are associated with the content item 104 through the ID 106. For example, the system through which the content item 100 is tracked may have required the owner to establish an account to track the use of the content item 100 and may have also required the owner to designate the sharing level 108 and the cost-per-use amount 110. In other implementations, the sharing level 108 and the cost-per-use amount 110 are stored in the metadata 104.

The content item 100 is associated with a sharing level 108 of "use permitted," which describes whether entities other than the owner of the content item 100 can use the content item 100 and the extent by which the use is permitted. In this example, because the sharing level 108 associated with the content item 100 indicates "use permitted," use of the content item by entities other than the owner is permitted. The sharing level 108 can include levels that, for example, permit or prevent use of the content item by anyone, or permit or prevent use by one or more specific entities or groups of entities. For example, the owner of the content item 100 may have specified the sharing level 108 to be "use permitted to publishers of web pages associated with dogs," and therefore, any publisher of a web page about dogs can use the content item 100 while other entities cannot.

The content item 100 is associated with a cost-per-use amount 110 of 2%. The cost-per-use amount 110 is an amount other entities would have to pay in order to use the content item 100. The cost-per-use amount 110 can include a percentage or a specific amount. The cost-per-use amount 110 of 2% relates to the percentage of revenue generated from the web page on which the content item 100 is displayed. For example, if an entity displayed the content item 100 on a web page that generates revenue from selling products, the displaying of the content item 100 is considered use of the content item 100 and therefore, the publisher of the web page would pay 2% of all revenue generated from the web page to the owner of the content item 100.

The metadata tags 104 include an owner identification 112, "ABCDEF," which is the identification of the owner of the content item 100. The owner can include a person who made the content item with a drawing program, used a camera to take an image, or bought the content item from another entity. The owner identification 112 can be used to track the content items specific to each owner.

The metadata tags 104 also include a camera model 114, "Canon XSI," associated with the content item 100, which is the camera that was used to take a picture of the dog. The metadata tags 104 also include a date 116, "Jan. 1, 2009," which is the date the content item 100 was created. The metadata tags 104 also include a location 118, "Atlanta, Ga.," which is the location of where the subject of the content item 100 was located.

The metadata tags 104 also include keywords 120, "dog" and "greyhound," which are terms that are used to describe the subject matter of the content item 100. The keywords 120 as well as any of the other metadata 104 can be defined by the owner. The owner may have included the keywords 120 "dog" and "greyhound" in the metadata. Any number of keywords can be associated with the content items.

While the content item 100 is associated with metadata tags stored in the EXIF format, other content items may include metadata tags stored in IPTC or XMP formats, or other formats. The content item 100 and the metadata tags 104 can be used in various ways as described in greater detail below.

The content item 100 can also be tagged using other tagging methods. The tag data can, for example, be encoded directly into an image instead of into the EXIF data. For example, the data can be encoded into an image file after the END command sent to a parser. A camera can also be used to tag a photograph after a photographer takes a photograph of an image. Tagging may also be done using various software (e.g., Photoshop provided by Adobe, Picasa provided by Google).

§2.0 Revenue Generation

Figure 2:
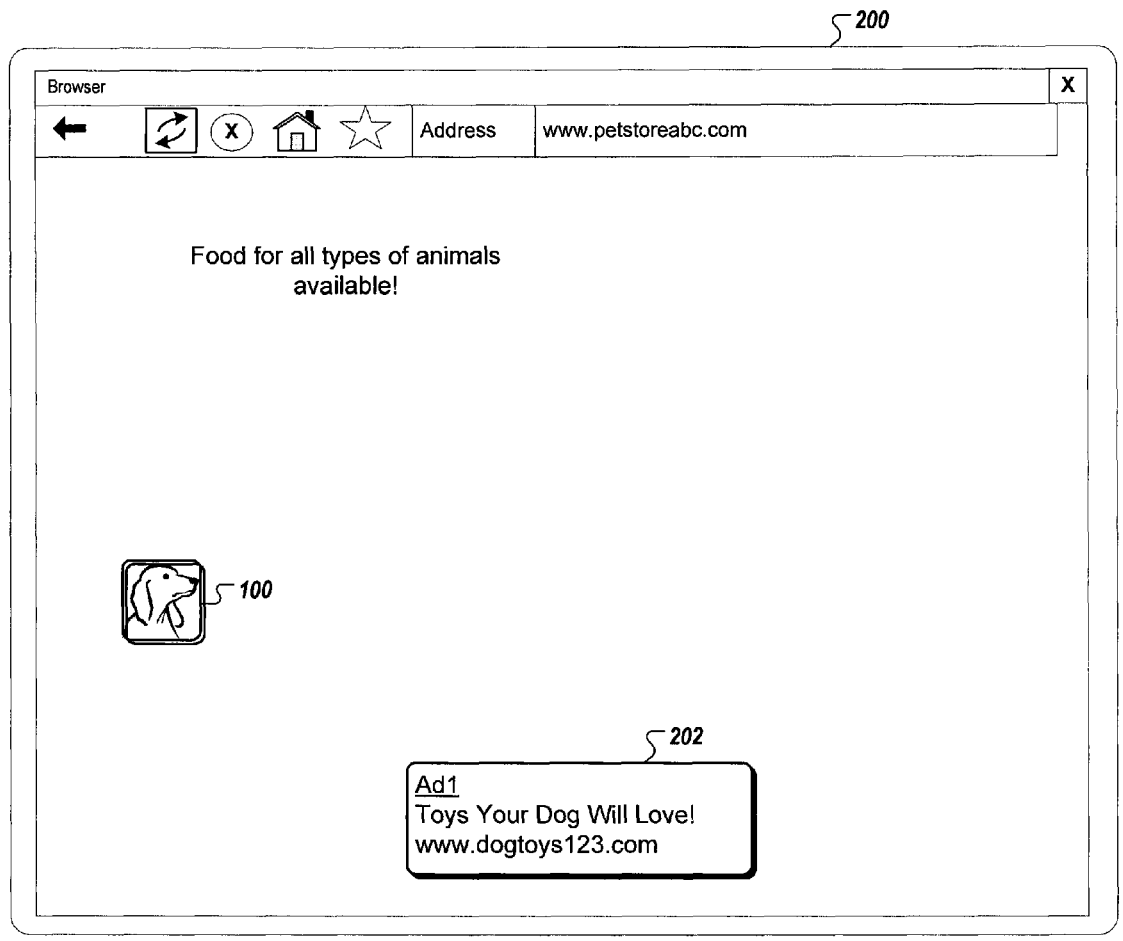
FIGS. 2-4 are examples of web pages displaying tagged content items.

FIG. 2 shows an example of a web page 200 displaying the content item 100. The web page 200 is www.petstoreabc.com and is a web page about a pet store. A publisher of the web page 200 uses the content item 100 on the web page 200 according to the sharing level information in the metadata tags 104. Before displaying the content item 100 on the web page 200, the publisher of the web page 200 may have encountered the content item 100 in a system that allows use of the content item 100 according to specific terms, and may have indicated interest in using the content item 100 according to those terms.

For example, in one implementation, the publisher is presented with a sharing level agreement displaying the terms of the sharing level of the content item 100. The sharing level agreement indicates that use of the content item 100 is permitted as long as 2% from all revenue from the web page 200 is paid to the owner of the content item 100. The sharing level agreement also indicates that revenue is to be paid to the owner of the content item 100 only when the content item 100 is displayed on the web page 200, and that revenue generated during times when the content item 100 was not displayed do not have to be included in the revenue from which the 2% is calculated.

As discussed above, the sharing level 108 of the content item 100 indicates "use permitted," which means that use of the content item 100 is permitted to entities other than the owner at a revenue share amount of 2%. It as assumed that the publisher of the web page 200 agreed to the sharing level agreement before being permitted to use the content item 100 on the web page 200. For example, the system through which the publisher gained access to the content item 100 may have required the publisher to sign up for an account to track use of the content item 100. The system can associate the content item 100 with the owner of the content item through the owner identification attribute of the metadata 104.

In this example, the web page 200 generates revenue from advertisement 202 displayed on the web page 200. Therefore, 2% of the revenue generated from advertisement 202 is paid to the owner of the content item 100 as long as the content item 100 is displayed on the web page 200. If more than one advertisement was displayed on the content page 200, 2% from the revenue generated from each advertisement is paid to the owner of the content item 100. The web page 200 could also have generated revenue from other sources, as will be described in greater detail below.

In some implementations, a user browsing the web page 200 can either click on or hover above the content item 100 or 302 to reveal the metadata tags 104 and 302. For example, when the user hovers with a mouse pointer over the content item 100, the user can be presented with the contents of the metadata tags 104. As another alternative, when a user clicks on the content item 100, a window can be displayed proximate to the content item 100 and including the content of the metadata tags 104.

§3.0 Identifying Advertisements from Metadata

Figure 3:
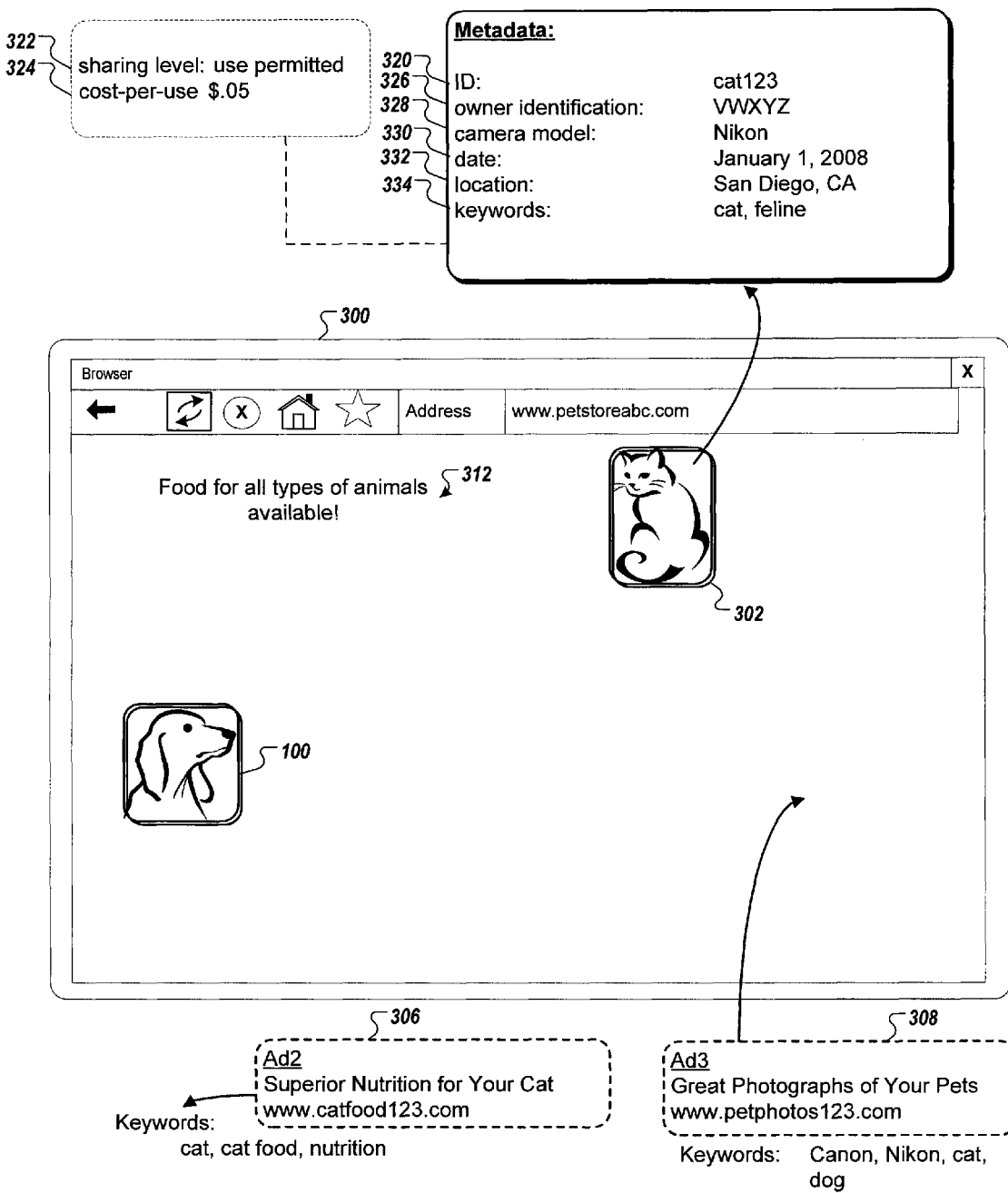

FIG. 3 shows an example web page 300 that displays the content item 100 as well as an additional content item 302 that is associated with metadata tags 304. The metadata tags 304 of the content item 302 are also in EXIF format because the content item 302 is an image file.

The metadata tags 304 state that the identification 320 of the content item 302 is "cat123," the owner identification 326 of the content item 302 is "VWXYZ," the camera model 328 used to take a picture of the content item 302 is "Nikon," the date 330 associated with the content item 304 is "Jan. 1, 2008," the location 332 associated with the content item 304 is "San Diego, Calif.," and the keywords 334 associated with the content item 302 are "cat" and "feline." The content item 302 is also associated with a sharing level 322 that indicates "use permitted," the cost-per-use 324 amount is $0.05 per impression. The sharing level 322 and the cost-per-use amount 324 are stored separately from the metadata tags 304.

The publisher of the web page 300 submits a request to an advertisement system for one advertisement to be displayed on the web page 300. The advertisement system uses the metadata attributes 104 and 304 of the existing content items 100 and 302 on the web page 300 to select one or more relevant advertisements.

The advertisement system selects a set of candidate advertisements 306 and 308 that include one or more keywords that match any of the subject attributes of the metadata tags 104 and 304. From this set of candidate attributes, the advertisement system selects one advertisement that is associated with the highest number of keywords that match the subject attributes of the metadata tags 104 and 304.

In the example of FIG. 3, the advertisement system selected advertisements 306 and 308 as the candidate attributes because each of these advertisements includes at least one keyword that matches the subject attributes of either the metadata tags 104 or the metadata tags 304. Advertisement 306 is associated with the keywords "cat," "cat food," and "nutrition." The keyword "cat" matches the keyword 334 "cat" in the metadata tags 304. Therefore, advertisement 306 includes one keyword that matches two metadata attributes 304. Advertisement 308 is associated with the keywords "Canon," "Nikon," "cat," and "dog." The keywords "Canon" and "dog" match the keyword 120 "dog" and the camera model 114 "Canon" in the metadata tags 104. The keywords "cat" and "Nikon" of advertisement 308 match the keyword 334 "cat" and the Camera Model 328 "Nikon" in the metadata tags 304. Therefore, advertisement 308 includes four keywords that match four of the subject attributes of the metadata tags 104 and 304.

The advertisement system selects advertisement 308 as the advertisement to be displayed on the web page 200 because advertisement 308 includes four keywords that match metadata 104 and metadata 304, while advertisement 306 only includes two keywords that match the metadata 104 and 304. If the publisher of the web page 200 had requested two advertisements, both advertisements 306 and 308 would be provided and displayed on the web page 200. The number of advertisements selected can be based on the number of advertisements requested by the publisher.

While this example compared keywords associated with each candidate advertisements to the metadata, any parts of the advertisements can be compared to the metadata, such as the advertisement URL, a creative associate with the advertisement, or the advertisement name.

§4.0 Adding & Using Context Information

Figure 4:
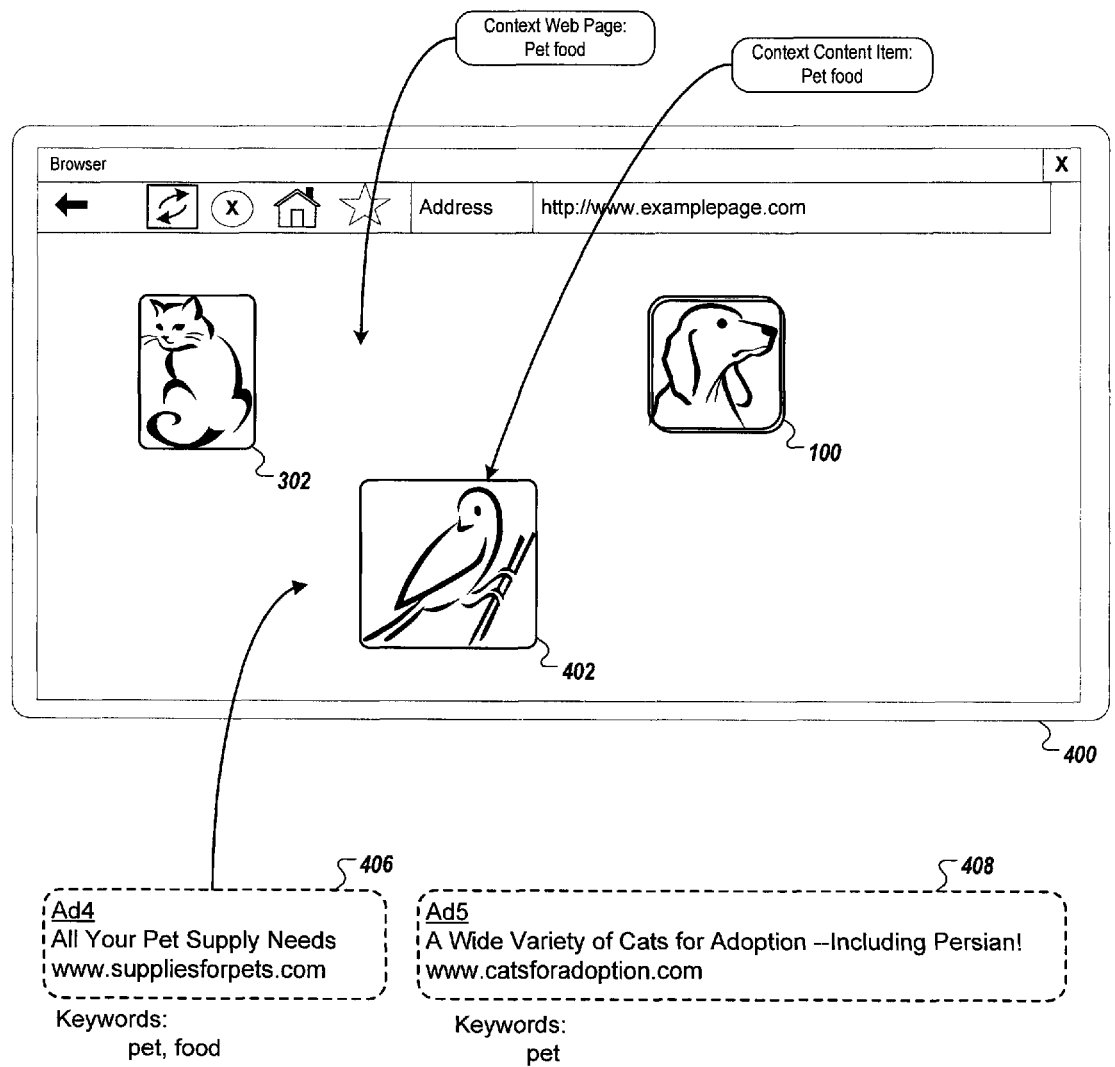

FIG. 4 is a block diagram of an example web page 400 displaying tagged content items 100, 302, and 402. The web page 400 does not contain any text and only contains images which are displayed as content items 100, 302, and 402. Because web page 400 does not contain any text, using web attributes associated with the content items displayed on the web page 400 to determine context to associate with the web page 400 can allow for more relevant advertisements to be displayed on the web page 400, and can facilitate more relevant searches for users searching the Internet for web pages. The web attributes associated with each of the content items are used to determine context to be associated with the content items located on the web page 400.

The web attributes of the content items 100, 302, and 402 include information associated with other web pages on which each content item is displayed, such as the name of the web page and the URL associated with the web page. The web attributes can include the content of the other web pages on which each of the content items are displayed, and information regarding other content items that were displayed on the other web pages.

The web page 400 includes the content items 100 and 302, which were both previously displayed on the web page 300 (www.petstoreabc.com), a web page dedicated to pet stores. The entire URL of the web page 300 is a web attribute that can be used in determining context information. As an alternative, a portion of the URL, such as, for example, "pet store," can be used in determining the context information. Based on this determination, the context "pet store" could be assigned to the web page 400.

Web attributes such as the content of the web page 300 can also be used in determining the context. For example, the context "pet food" could be assigned to the web page 400 based on the URL and the content of the web page 300. In particular, the content "food for all types of animals available!" 312 of the web page 300 (see FIG. 3) can be combined with the URL attribute "pet store" to determine the context "pet food" by taking one word from each web attribute. Thus, the information about where the content items 100 and 302 were displayed previously is used to add context to a web page that does not include any text. Therefore, the web page 400 is associated with the context "pet food." The content items 100, 302, and 402 can also be associated with the context "pet food" by, for example, including a context tag having the value "pet food" in the metadata tags for the content items.

The context "pet food" associated with the content items 100, 302, and 402 and the web page 400 can now be used to identify relevant advertisements for display on the web page 400. The web attributes can also be used to select relevant advertisements.

The web attributes of the content items 100 and 302, namely www.petstoreabc.com and "food for all types of animals available!" are compared with the keywords associated with a pool of advertisements. Candidate advertisements 406 and 408 are selected because both these advertisements include keywords that match all or parts of the web attributes of the content items 100 and 302. Candidate advertisement 406 includes the keywords "pet" and "food" that match parts of the web attributes www.petstoreabc.com and "food for all types of animals available!" Candidate advertisement 408 includes the keyword "pet" that matches parts of the web attribute www.petstoreabc.com.

Once the candidate advertisements 406 and 408 are selected, the advertisement with the highest number of keywords that match the web attributes is selected to be displayed on the web page 400. In this example, advertisement 406 is selected because advertisement 406 included two keywords that matched the web attributes while advertisement 408 only had one keyword that matches the web attributes. While this example compared keywords of advertisements to the web attributes, any parts of the advertisement can be compared to the web attributes, such as the advertisement URL, a creative associate with the advertisement, or the advertisement name. In addition, the comparison can involve more than just looking at the number of matches. For example, certain aspects of the advertisement attributes or the web page attributes may be weighted differently for purposes of selecting an advertisement.

§5.0 User Interface

Figure 5:
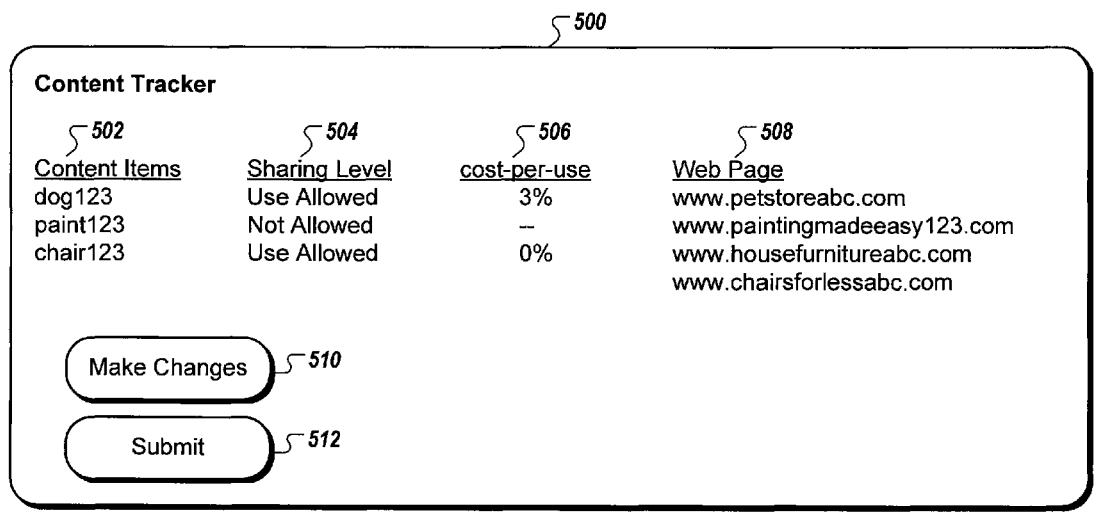
FIG. 5 is the example of a user interface for an owner of a content item.

FIG. 5 is an example of a user interface 500 that can be provided to an owner of one or more content items in order for the owner to track the content items. The user interface 500 shown in FIG. 5 is presented to the owner of the content item 100 by a system that tracks use of the content items and enforces the sharing level terms. The user interface 500 provides a way for each owner to manage their account. The user interface 500 displays each content item 502, the sharing level 504 associated with each content item 502, and the cost-per-use amount 506 associated with each content item 502. The owner is also able to view the web pages 508 on which each content item 502 are displayed.

The owner that is presented the user interface 500 owns three content items "dog123," "paint123," and "chair123." Dog123, which is content item 100, is associated with a sharing level of "use allowed," and a cost-per-impression amount of 3%. The owner can see that "dog123" is currently only displayed on the web page www.petstoreabc.com. The content item "paint123" is associated with a sharing level of "not allowed" and, accordingly, no cost-per-use amount. The owner can see that "paint123" is currently only displayed on the web page www.paintingmadeeasy123.com. The content item "chair123" is associated with a sharing level of "use allowed" with a cost-per-use amount of 0%. The owner can see that "chair123" is currently displayed on the web page www.housefurtnitureabc.com as well as the web page www.chairsforlessabc.com.

The user interface 500 can also additionally display the amount of revenue generated from each of the web pages 508 according to the sharing level 504 and the cost-per-user amount 506. For example, if the content item 100 "dog123" displayed on the web page www.petstoreabc.com had generated $30 in revenue, this information could also be displayed on the user interface 500.

The owner can use a "make changes" control 510 to change the parameters associated with any of the content items 502 through the user interface 500. When the owner selects the make changes control 510, the owner is given an opportunity to add content items, remove any of the content items, or change any of the sharing levels 504 or the cost-per-use amounts 506. Each time a change is made by the owner, the publisher of the web page that is affected by the change receives a notification of the change and may have to separately agree to the changed terms as will be described in greater detail below.

In some implementations, the user interface 500 can include the images of each content item 502, instead of the identification of each content item 502. The user interface 500 can also allow a user, e.g., an owner, to hover over an image or the identification of the content item 502 and an overlay of a web page that displays the image can be shown to the user. The web page can be, for example, an overlay on top of the user interface 500. In other implementations, the user interface 500 allows a user to click on an image of the content item 502 or the identification of a content item 502, and to be forwarded to the one or more web pages that include the image.

§6.0 Advertisement Publishing and Tracking

Figure 6:
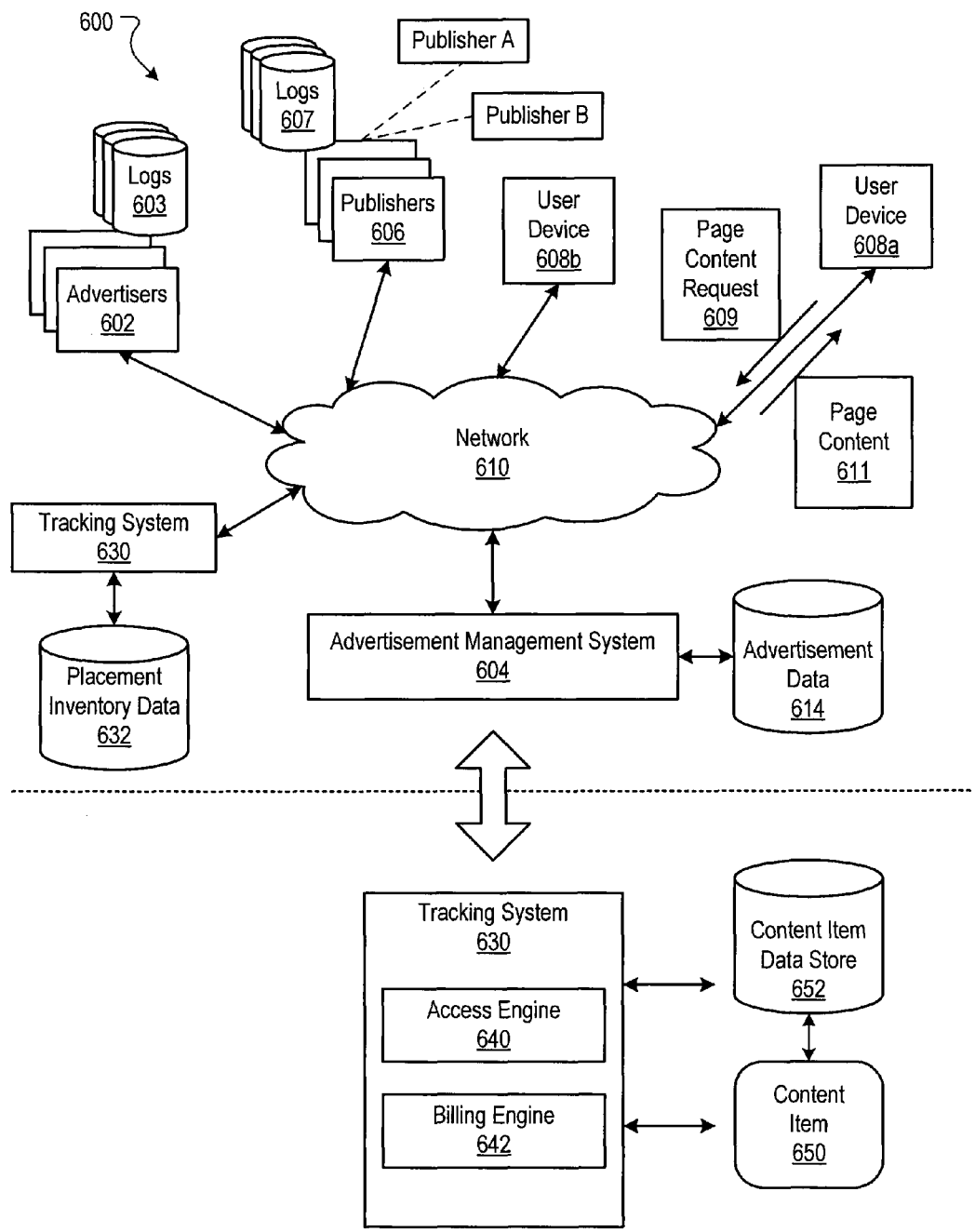
FIG. 6 is a block diagram of an example online environment in which a content item tracking system can be implemented.

FIG. 6 is a block diagram of an example online environment 600 in which a content item tracking system 630 can be implemented. The online environment 600 can facilitate the identification and tracking of placements and the serving of content items, such as images, web pages and advertisements, to users. A network 610, such as a local area network (LAN), wide area network (WAN), the Internet, or a combination thereof, connects advertisers 602, an advertisement management system 604, publishers 606, user devices 608a and 608b, and a tracking system 630. The online environment 600 may include many thousands or more advertisers 602, publishers 606 and user devices 608.

In some implementations, one or more advertisers 602 can directly or indirectly enter, maintain, and track advertisement information in the advertisement management system 604. The advertisements can be in the form of, for example, graphical advertisements such as banner advertisements, text only advertisements, image advertisements, audio advertisements, video advertisements, advertisements combining one of more of any of such advertisement types, or any other type of electronic advertisement document. The advertisements may also include embedded information, such as links, meta-information, and/or machine executable instructions, such as HTML or JavaScript™.

A user device, such as user device 608a, can submit a page content request 609 to a publisher 606. In some implementations, page content 611 can be provided to the user device 608a in response to the request 609. The page content 611 can include advertisements provided by the advertisement management system 604, or can include executable instructions, e.g., JavaScript™, that can be executed at the user device 608a to request advertisements from the advertisement management system 604. Example user devices 608 include, for example, personal computers, mobile communication devices, and television set-top boxes.

Advertisement requests can also be received from the publishers 606. For example, one or more publishers 606 can submit advertisement requests for one or more advertisements, e.g., creatives, such as several lines of text, a banner advertisement, an image advertisement, or a video advertisement, to the advertisement management system 604. The advertisement management system 604 responds by sending the advertisements to the requesting publisher 606 for presentation on one or more of the publisher's web properties (e.g., websites and other network-distributed content). The advertisements can include embedded links to landing pages, e.g., pages on the advertisers' 602 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies or arts-music), part or all of the content request, content age, content type (e.g., text, graphics, video, audio, or mixed media), or geo-location information.

In some implementations, a publisher 606 can combine the requested content with one or more of the advertisements provided by the advertisement management system 604. The combined content and advertisements can be sent to the user device 608 that requested the content (e.g., user device 608a) as page content 611 for presentation in a viewer (e.g., a browser or other content display system). The publisher 606 can transmit information about the advertisements back to the advertisement management system 604. The information can describe how, when, and/or where the advertisements are to be rendered (e.g., in HTML or JavaScript™).

Publishers 606 can include general content servers that receive requests for content (e.g., articles, discussion threads, music, video, graphics, search results, web page listings, or information feeds), and retrieve the requested content in response to the request. For example, content servers, related news content providers, retailers, independent blogs, social network sites, or any other entity that provides content over the network 610 can be a publisher.

The advertisers 602, user devices 608, and/or publishers 606 can also provide usage information to the advertisement management system 604 and/or tracking system 630. This usage information can include measured or observed user behavior related to advertisements that have been served, such as, for example, whether an impression, a conversion or a selection related to an advertisement has occurred. The usage information can also include traffic information, which includes user demographic information such as age, location, and gender, associated with a user device. The tracking system 630 performs financial transactions, such as charging the publishers 606 and charging the advertisers 602 based on the usage information. Such usage information can also be processed to measure performance metrics, such as a number of impressions, a click-through-rate ("CTR"), or a conversion rate.

An "impression" occurs, for example, each time that an advertisement is presented to a user. For example, in the online environment 600, an impression can occur each time the advertisement is presented on a user device 608. In the online environment, impressions can be tracked, for example, by advertisers 602 based on the number of times that the advertisement is successfully presented. Additionally, impressions can be tracked by publishers 608 based on the number of times that the advertisement is requested for presentation. In some situations, the number of impressions identified by the advertiser 602 can differ from the number of impressions identified by the publisher 606, as discussed below.

A click-through can occur, for example, when a user of a user device selects or "clicks" on a link to a content item returned by the publisher or the advertisement management system. The CTR is a performance metric that is obtained by dividing the number of users that clicked on the content item, e.g., a link to a landing page, an advertisement, or a search result, by the number of times the content item was delivered. For example, if a link to a content item is delivered 600 times, and three persons click on the content item, then the CTR for that content item is 0.5%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, or registering on a Website. Other actions that constitute a conversion can also be used.

§6.1 Tracking System

The tracking system 630 can maintain and track content items, such as image and video files, across the Internet and use information such as metadata associated with each content item to enforce entities to use the content items according to the terms specified in the metadata. Context information associated with the content items can also be used in selecting advertisements for display on web pages on which the content items appear.

Content item tracking can enable owners of the content items with new capabilities, such as to know at all times which other entities are currently using the content items and whether the use is consistent with terms specified in the metadata of the content item, to receive revenue from the entities that use the content items on the entities' web pages, and to facilitate identification of relevant advertisements on the web pages on which the content items appear.

For example, if an entity other than an owner of an image file is displaying the content item on a web page, when use of the content items by others is not permitted, the owner can be notified of the use. Similarly, if use is permitted at a cost, the entity using the content item can be charged according to the cost-per-use amount for as long as the content item is displayed on the web page.

To efficiently track the content items, the tracking system 630 can be coupled to advertisers 602, the advertisement management system 604, and publishers 606 through the network 610. In some implementations, the tracking system 630 can be implemented as a component of the advertisement management system 604. In other implementations, the tracking system 630 can be implemented separately from the advertisement management system 604.

Various software architectures can be used to implement the tracking system 630. One example implementation includes an access engine 640 and a billing engine 642. Other architectures and implementations can also be used.

Publishers 606, users, and advertisers can directly access the tracking system 630 by use of client devices. Users can be given accounts that can be configured to access the tracking system 630 to facilitate the provisioning of the functions and capabilities described below.

In the example implementation of FIG. 1, the access engine 640 monitors receipt, access, and use of content items. The billing engine 642 manages billing, payment and performance reconciliation. These functions are described in more detail below.

§6.2 Content Item Tracking and Use

In some implementations, the tracking system 630 can apply a tag to a content item 650 that includes at least a unique identifier associated with the owner of the content item 650. The tag can be a metadata tag that is an EXIF tag as described above. In some implementations, the owner can specify the metadata attributes to associate with the metadata tag. In other implementations, the content item 650 is received from the owner with the metadata tag already defined.

The unique identifier includes a combination of one or more letters and/or numbers or other characters that identifies the owner of a content item 650. The unique identifier can be used by the tracking system 630 to properly track the content item 650 and to know at all times the owner associated with the content item 650. For example, the content item 100 is associated with the owner identification "ABCDEF" which is a unique identifier that identifies the owner of the content item 100.

The content item 650 can be associated with a sharing level and a cost-per-use amount. The sharing level is a term that indicates whether use of a content item 650 is permitted by entities other than the owner, and whether the use is restricted to a particular entity or group. In some implementations, the sharing level can indicate that one group can use a content item 650 freely while no one else can. For example, the sharing level can indicate that non-profit organizations can use the content item 650, while no other entities are permitted. The sharing level can also indicate specific persons permitted or not permitted to use the content item 650. For example, the sharing level can indicate that only Joe Smith of XYZ company is permitted to use the content item 650.

The cost-per-use amount is a monetary amount that must be paid by entities using the content item 650 to the owner of the content item 650. In some implementations, the cost-per-use amount is a part of the sharing level. The cost-per-use amount can include a percentage or a monetary value. For example, the cost-per-user amount can include a percentage of revenue from a web page on which the content item 650 is displayed. The cost-per-use amount is charged to an entity using the content item 650 consistent with the cost-per-use indicated in the metadata.

For example, the sharing level of the content item 100 is "use permitted," which means that use is permitted by entities other than the owner. The cost-per-use of the content item 100 also indicates that 2% of all revenue generated from any web page that includes the content item 100 must be paid to the owner of the content item 100.

In some implementations, the cost-per-use for the same content item can be different based on the sharing level. If the sharing level is tied to a specific group or person, the cost-per-use may vary depending on the group or person. For example, an owner of the content item 650 can associate a sharing level "use allowed for websites about cats" and a cost-per-use amount may be 4% for the content item 650. The owner can further specify a sharing level of "use allowed for websites about pet stores" and the cost-per-use amount for that sharing level may be 2%. Therefore, more than one sharing level and cost-per-use amount can be associated with the same content item 650.

In some implementations, the owner identification, the sharing level, and the cost-per-use amount are defined and able to be modified at all times by the owner of the content item 650. In other implementations, the tracking system 630 defines the owner identification, the sharing level, and the cost-per-use amount. The tracking system 630 can use information associated with the content item 650 to change the sharing level and the cost-per-use amount. For example, the tracking system 630 can use impressions and click-through rate information associated with advertisements displayed with the content item 650 on web pages to increase or decrease the cost-per-use amount or change the sharing level of the content item 650.

For example, the content item 650 may be displayed on a web page A that also includes advertisement A, and the cost-per-use amount of content item 650 may be set to be 1%. If the tracking system determines that the click-through rate of advertisement A when displayed with the content item 650 is much higher than the advertisement A on other web pages that do not include the content item 650, the tracking system 630 can increase the cost-per-use amount of content item 650 because the tracking system determines a correlation between the high click-through rate and the content item 650 being displayed on the same web page as advertisement A. In some implementations, the tracking system 630 can increase the cost-per-use amount or change the sharing level without notifying the owner of the content item 650. In other implementations, the tracking system 630 can notify the owner of the correlation and request permission to change the cost-per-use amount or the sharing level.

The content item 650 is stored with other content items in a content item data store 652. Entities can request use of the content item 650 through the tracking system 630. For example, publishers 606 can log onto the tracking system 630 through a user interface and be presented with all the content items in the data store 652 to select one or more for use. Once an indication of a selection of any of the content items, e.g., the content item 650, is received, an access engine 640 can access the metadata tag of the content item 650 to identify the owner identification, the sharing level, and the cost-per-use amount. The access engine 640 can control use of the content item 650 based on the sharing level and the cost-per-use amount.

In some implementations, if the entity requesting use of the content item 650 does not already have an account with the tracking system 630, the access engine 640 may prompt the entity to create an account so that tracking of the content item can be monitored.

In some implementations, if use of the content item 650 is permitted as indicated by the sharing level, the access engine 640 can provide a sharing level agreement to the entity requesting access to the content item 650. The sharing level agreement can include terms associated with use of the content item 650 such as the sharing level, the cost-per-use amount, as well as other terms such as how often the revenue will be deducted from the entity's account, and how the share revenue will be calculated.

The access engine 640 can require acceptance of the terms of the sharing level agreement before permitting the entity to use the content item 650. If use of the content item 650 is permitted and the entity accepts the terms of the agreement, the entity is provided with the content item 650. An account associated with the entity can be charged according to the cost-per-use amount based on the terms. If, for example, the cost-per-use amount is a single amount per use, every time the content item 650 is used by the entity, the account of the entity is charged the cost-per-use amount.

In some implementations, the access engine 640 can periodically crawl and monitor web pages to determine whether one or more of the content items in the content item data store 652 are displayed on any web pages and determine whether the publishers of these web pages have agreed to the terms of use of each content item. If the sharing level associated with the content item indicates that use is not permitted, the access engine 640 can send a notification to the owner of the content item notifying the owner of the unpermitted use. In some implementations, the access engine 640 can also send a notification to the entity using the content item indicating that use is not permitted and that the entity must cease use of the content item. For example, if the entity is a publisher displaying the content item 650 on a web page and use of the content item 650 is not permitted, the access engine 640 can send the notification to the publisher requiring removal of the content item 650 from the publisher's web page.

For example, suppose a user takes a photograph of a sunset using a camera. After the image is downloaded onto a computer, the user can use photograph editing software to automatically make modifications to the image. In addition to tagging the image with EXIF data such as the type of camera used and shutter speed, the software can be used to apply the identification of an account the user may hold with the tracking system 630. For example, the individual may hold an account that is used to track revenue generated from advertisements on one or more publisher's web pages. The user can use the software to embed into the image her account ID as well as a share level. The user can upload the image to a website and can also indicate whether the image can be used by others, and the revenue share associated with the image.

When a publisher sees the image and uploads the image to a web page of the publisher and the web page is running advertisements, the tracking system 630 can crawl the web page of the publisher and can see the new image uploaded on the publisher's web page. The tracking system 630 can read the EXIF tags and see that the owner of the image is the user, who is not the publisher of the web page, and can determine that the user has asked for a share of revenue generated from any web page on which the image is displayed. The system can pay the percentage of the revenue generated from the publisher's web page indicated by the EXIF tag to the user.

In some implementations, the account also can be used to tag a content item. For example, an uploaded content item can be tagged through a user interface using the account.

In some implementations, content items can be registered with an account system using the tracking system 630 instead of being tagged. The content item is uploaded to an account of an owner of the content item and the content item is associated with the owner. A publisher can browse content items available for use using an interface to the system and can select content items for use, as described above.

In some implementations, if an entity uses the content item 650 when use of the content item is not permitted, the billing engine 642 can charge the entity a fine based on the use. The fine can be determined by the owner or by the tracking system 630. The tracking system also can bar an entity that makes improper use of content items from participating in other activities, such as interfacing with the advertisement management system 604.

In some implementations, the tracking system 630 can provide an owner of each of the content items an account to keep track of where each content item is displayed, as well as the current sharing level and cost-per-use amount associated with each content item. Each owner can make changes to any of the sharing levels and cost-per-use amounts through a user interface, such as, for example, the user interface 500 of FIG. 5, on a web page associated with the tracking system 630. The account can be used to notify the owner of unpermitted uses and of revenue generated from permitted use of each content item.

In some implementations, the content item 650 can be associated with the owner in other ways than being explicitly tagged with the metadata. For example, the owner can upload the content item 650 to the tracking system and the content item 650 can be associated with a unique URL. The URL can be, for example:

http://imagetrackingservice.com/UNIQUEIDENTIFIER-.jpg

Publisher who use the content item can use the unique URL as the source of the content item 650 instead of using the actual content item 650. The attributes such as the sharing level and the cost-per-use as well as the owner identification can be stored in the tracking system and can be associated with the owner through the unique URL.

§6.4 Revenue Generation

In some implementations, the access engine 640 identifies the content item 650 on a web page that includes one or more advertisements. For example, the content item 650 can be displayed on a publisher's web page that includes one or more advertisements related to the content of the web page.

In some implementations, the billing engine 642 calculates a web page revenue amount from the advertisements on the web page. The web page revenue amount is the amount of revenue generated by a web page. If the web page generates revenue from advertisements, then the web page revenue amount is the amount of revenue generated from the advertisements displayed on the web page. The advertisements can be any type of advertisement including, but not limited to, graphical advertisements or text advertisements.

Advertisements can, for example, generate revenue based on a cost-per-click amount. If an advertisement is associated with a cost-per-click amount of $0.20, the advertiser associated with the advertisement is charged $0.20 every time the advertisement is clicked on by a user. A publisher displaying the advertisement on a web page can receive a portion of the CPC amount, such as, for example, half the CPC amount. In some implementations, the web page revenue amount can be calculated based on the portion of the CPC amount the publisher receives.

In some implementations, the web page revenue amount is the amount of revenue generated from the advertisements that are displayed on the web page along with the content item 650. If the content item 650 is not displayed on the web page 200 during a certain period of time, the web page revenue amount does not include the revenue generated from the advertisements during this period of time.

For example, the content item 100 is displayed on the web page 200 along with the advertisement 202. As long as the content item 100 is displayed on the web page 200 with the advertisement 202, any revenue generated from the advertisement 202 is a part of the page revenue amount. If the content item 100 is not displayed on the web page 200 during a certain period of time, any revenue generated from the advertisement 202 during that time is not added to the page revenue amount.

In other implementations, the web page revenue amount includes revenue generated from advertisements that are displayed on the web page but may not necessarily be displayed at the same time as the content item 650. This can occur in cases where the content item 650 only appears on the web page at certain times and does not appear at other times. Even though the content item 650 does not appear on the web page, the revenue generated from the advertisements displayed at the time when the content item 650 does not appear is also included in the page revenue amount.

For example, suppose an advertisement about horses was displayed on the web page 200, but only when the content item 100 was not displayed. Even though the content item 100 is not displayed, the web page revenue amount includes the revenue generated from the advertisement about the horse.

In some implementations, the billing engine 642 calculates a share revenue amount based on the page revenue amount and the cost-per-use amount. The share revenue amount is a portion of the page revenue amount that is given to the owner of the content item 650. The billing engine 642 can identify the sharing level associated with the content item 650 and identify the cost-per-use associated with the content item 650. For example, the cost-per-use of content item 100 is 2% and, therefore, 2% of all revenue generated from advertisements on the web page 200 is the share revenue amount.

For example, if a web page displays a single advertisement that has a CPC amount of $0.02 and the advertisement is clicked on 10,000 times in one day, revenue of $200 is generated for the day. If the web page displays a content item 650 with a cost-per-use amount of 1%, the owner of the content item 650 receives $2 (0.01*200) for the day.

In some implementations, the billing engine 640 adds the share revenue amount to the account of the owner of the content item 650. In some implementations, the share revenue amount can be calculated hourly, daily, weekly, monthly or yearly. The share revenue amount can be applied to the owner account on the same schedule or an alternate schedule. In some implementations, the owner of the content item 652 can select how often the share revenue amount should be provided to the owner. For example, the owner can select to receive the share revenue amount every three weeks or every ten days.

In some implementations, the billing engine 642 can deduct the share revenue amount from an account of the publisher using the content item 650 on the same schedule that the share revenue amount is calculated.

In some implementations, the billing engine 642 can calculate the share revenue amount on a different day than when the share revenue amount is added to the owner account as well as a different day than when the share revenue amount is deducted from the publisher account. The billing engine 642 can calculate the share revenue amount, deduct the amount from the publisher's account, and hold the revenue until a later date and then deposit the revenue into the owner's account.

For example, suppose the owner of the content item 100 is associated with an account that deposits any revenue generated from the content item 100 into the owner account monthly. The billing engine 642 can calculate the share revenue amount weekly, withdraw the revenue share amount from the account of the publisher of the web page 200, hold the revenue for three weeks and then deposit the revenue amount into the account of the owner of the content item 100. In some implementations, the billing engine 642 notifies the owner of the content item 650 and the publisher of the web page from which the share revenue was calculated of each deposit and/or withdrawal, respectively. In some implementations, if the content item 650 is associated with a sharing level that does not allow use by entities other than the owner, the billing engine 642 can fine the entity for using the content item 650. The fine can be determined by the owner or the tracking system 630. The fine can, for example, be based on the revenue generated on the web page of the entity. For example, the fine may include giving all or portions of the revenue generated from the web page to the owner of the content item 650. In some implementations, revenue can be generated from sources other than advertisements. If the web page is an online merchant, the page revenue amount can include the amount of revenue generated from the sale of the online goods. If the web page includes membership fees, the page revenue amount can include the amount of revenue generated from the membership fees.

In some implementations, the percentage of revenue can be based on how significant a content item 650 is to a web page. For example, the revenue can be based on the size of a graphic or a movie relative to the rest of a web page. The percentage can be based on a proportion of the web page the content item 650 covers. For example, if a content item covers 10% of the web page, the percentage of revenue can be 10%. In other implementations, the percentage of revenue can be based on how many other content items 650 are on the web page, and the revenue can be shared between all the owners of the content items. The percentage of revenue can also be based on a type of the content item 650. For example, an owner of a movie file can receive a higher percentage of revenue than an owner of an image file. The percentage of the revenue can also be based on a location on the web page. For example, content items 650 placed at the top of web pages can receive higher revenue share than content items 650 placed at the bottom.

§6.5 Identifying Advertisements from Metadata

In some implementations, metadata associated with the content item 650 can be used to select advertisements for a web page on which the content item 650 is displayed. For example, the web page on which the content item is displayed may not be associated with any text. Therefore, an advertisement system may not have a way of searching for relevant advertisements to display on the web page because the system does not have any text to use for keywords when searching for relevant advertisements. The advertisement system can instead select relevant advertisements using the metadata of the content items on the web page.

In some implementations, the tracking system 630 can receive a request for an advertisement to be displayed on a web page and the tracking system 630 can use the metadata of the content items on the web page in selecting the advertisement. The access engine 640 can access the web page and determine the content items currently on the web page. The access engine 640 can identify the metadata associated with each content item.

The access engine 640 can identify any advertisement 614 that includes keywords that match any of the metadata associated with the content item 650. The access engine 640 can compare each of the metadata attributes of the content items on the web page to the keywords of the advertisements 614. In some implementations, the access engine 640 can select as candidate advertisements any advertisement that includes one keyword that matches any metadata attribute.

In some implementations, the access engine 640 can compare the camera model in the metadata with keywords of advertisements 614 to select candidate advertisements that are associated with keywords that include the camera model. For example, if the camera model is "Nikon," the candidate advertisements can include "Nikon" as a keyword.

In some implementations, the access engine 640 can select candidate advertisements based on a device that was used to take a picture of the content item 650. For example, suppose a particular type of camera was used to take a picture of the content item 650. The access engine 650 can select candidate advertisements that include that camera type as a keyword.

In some implementations, the access engine 640 can use geo coordinates of where a picture was taken to select candidate advertisements. The geo coordinates can be stored as metadata in the image. The access engine 640 can select candidate advertisements that include keywords that are associated with the geo coordinates. For example, the candidate advertisements can include keywords that include a language associated with the geo coordinates or a name of a store near the geo coordinates.

In some implementations, the access engine 640 can determine how many metadata attributes each of the selected advertisements match. For example, in FIG. 1, candidate advertisement 306 included one keyword "cat" that matched the metadata 104. Advertisement 308 included four keywords "Canon," "Nikon," "cat," and "dog" that matched the metadata 104 and 304.

In some implementations, the access engine 640 can rank the candidate advertisements based on the number of matching keywords and metadata attributes. For example, in FIG. 1, advertisement 308 is ranked first because advertisement 308 had four keywords that matched the metadata, and advertisement 306 is ranked second because advertisement 306 had one keyword that matched the metadata.

In some implementations, other parts of an advertisement are compared with the metadata attributes to determine which advertisement is the most relevant. For example, the creative of the advertisement can be compared with the metadata to determine whether any words in the creative match the metadata.

In some implementations, the advertisements are provided in response to the request based on the ranking. For example, when one advertisement is requested, the highest ranking advertisement is provided.

In some implementations, if the metadata indicates that use is not allowed, the access engine 640 does not take into consideration the metadata of that particular content item when selecting advertisements. Therefore, if a publisher is using a content item on a web page and the use is not permitted, and the publisher is hoping to receive relevant advertisements based on the content item, the access engine 640 does not use the content item and notifies the publisher that the metadata of the content item was not used.

§6.6 Adding & Using Context Information

In some implementations, web related information about a content item can be used to add context to other content items appearing with the content item on a new web page as well as to add context to the new web page on which the content item is displayed.

The access engine 640 can identify web attributes associated with a first instance of a content item 650 on a first web page. The web attributes are attributes associated with web pages on which the content item 650 has been displayed. The web attributes can include any portion of a URL of a web page, keywords associated with a web page, subject matter associated with a web page, content associated with a web page, as well as information associated with any content items appearing on a web page. The web attributes can be used to determine context information. Context information is a meaning that is given to a group of terms such as the web attributes. The context information can be associated with the web page or content item.

For example, content items 100 and 302 both appeared on a web page 300 with the URL www.petstoreabc.com and therefore, any parts of the URL, which is a web attribute, can be used to determine the context information for both the content item 100 and the content item 302.

In some implementations, the web attributes are used as the context information. For example, if a content item 650 appeared on www.vegetable.com, then the context may be determined to be "vegetable."

In some implementations, the access engine 640 identifies a second web page that is displaying a second instance of the content item 650. The second web page may or may not be related to the first web page. For example, in FIG. 4, the web page 400 displays a second instance of the content item 302 and a second instance of the content item 100.

In some implementations, the access engine 640 can associate the context information for the first instance of the content item 650 with the second instance of the content item 650. In addition, content information for the second instance can be associated with the first instance.

In some implementations, the second web page does not include any text and is composed of images entirely. Therefore, if the publisher of the second web page wanted to display advertisements on the second web page, the advertisement management system 604 would not be able to identify relevant advertisement using text of the web page since the web page does not include any text.

In some implementations, the context information can be used to select advertisements. For example, suppose a web page about recipes includes an image of an apple pie and the access engine 640 determines that the same apple pie image appears on a web page about holidays. The access engine then can associate a context of "holidays" with the apple pie image. If the publisher of the web page about recipes wanted to display advertisements, the access engine 640 can provide advertisements related to "holidays" because the image of the apple pie on the recipe web page has been associated with the context of "holidays" since it appeared on the holidays web page.

In some implementations, the web attributes include web attributes from every instance of a content item 650 and not just the first instance. For example, if the content item 650 has been displayed on ten web pages, the access engine 640 identifies web attributes from all ten web pages.

§6.7 User Interface

In some implementations, the tracking system 630 can provide a user interface, such as the user interface 500 of FIG. 5, to owners of content items to provide content items. The owners can use the interface to upload the content items to the tracking system 630. In some implementations, the content items have already been tagged with the metadata. In other implementations, the owners can use the user interface to tag the content items. The user interface can provide the owners with an ability to define one or more metadata attributes.

In some implementations, the tracking system 630 provides the user interface to allow the owner to define the sharing level and the cost-per-use amount associated with each upload content item. The user interface can also display the web pages on which each content item is displayed. Therefore, the owner is able to at all times keep track of each content item owned by the user.

In some implementations, an owner can change the sharing level and/or the cost-per-share amount associated with each content item through the user interface. For example, an owner may decide that the 0% cost-per-use amount of the content item "chair123" displayed on FIG. 5 is too low, and may want to change the cost-per-use amount to 3%. Once the owner makes a change, the owner can use a submit control 512 to submit the change, at which point the user interface is updated to reflect the change.

In some implementations, once a change is made to the sharing level or the cost-per-use amount associated with a content item, a publisher of the web page on which the changed content item resides receives a notification of the change. The notification can provide the publisher with the new terms and require the publisher to agree to the terms again. In some implementations, if the publisher does not agree to the new terms, the tracking system 630 can provide another notification to the publisher notifying them that they are no longer permitted to user the content item.

The user interface can also provide the owner with the share revenue amount associated with each web page on which the content item of the owner is displayed. The share revenue amount can indicate how much the owner has received thus far from each publisher.

Figure 7:
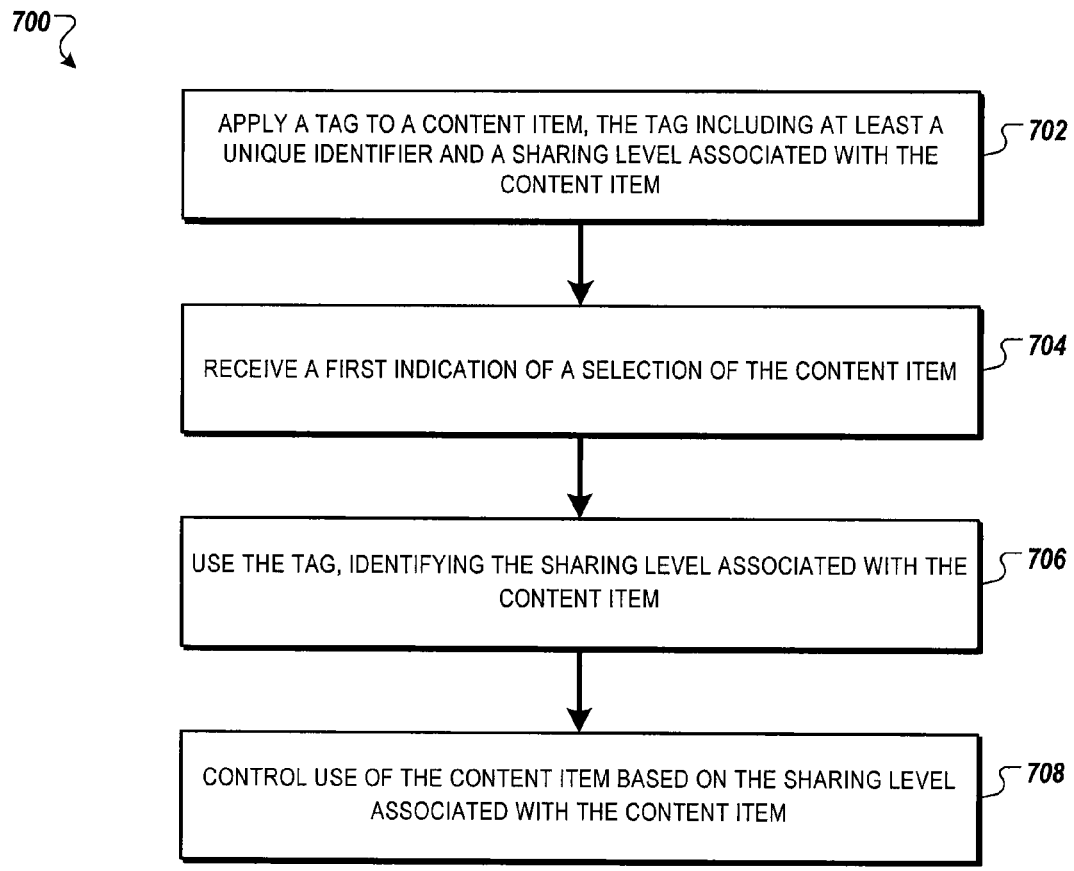
FIG. 7 is a flowchart showing an example process for controlling use of a tagged content item.

FIG. 7 is a flowchart of an example process 700 for controlling use of a tagged content item. The process 700 can be implemented in the tracking system 630 of FIG. 6, for example.

Initially, a tag is applied to a content item, the tag including at least a unique identifier 1 associated with the content item (702). For example, the access engine 640 can apply the tag to the content item.

A first indication of a selection of the content item may be received (704). For example, the access engine 640 can receive a first indication of a selection of the content item.

Using the tag, a sharing level associated with the content item is identified (706). For example, the access engine 640 can use the tag and identify a sharing level associated with the content item.

Use of the content item then is controlled based on the sharing level associated with the content item (708). For example, the access engine 640 can control use of the content item based on the sharing level associated with the content item.

Figure 8:
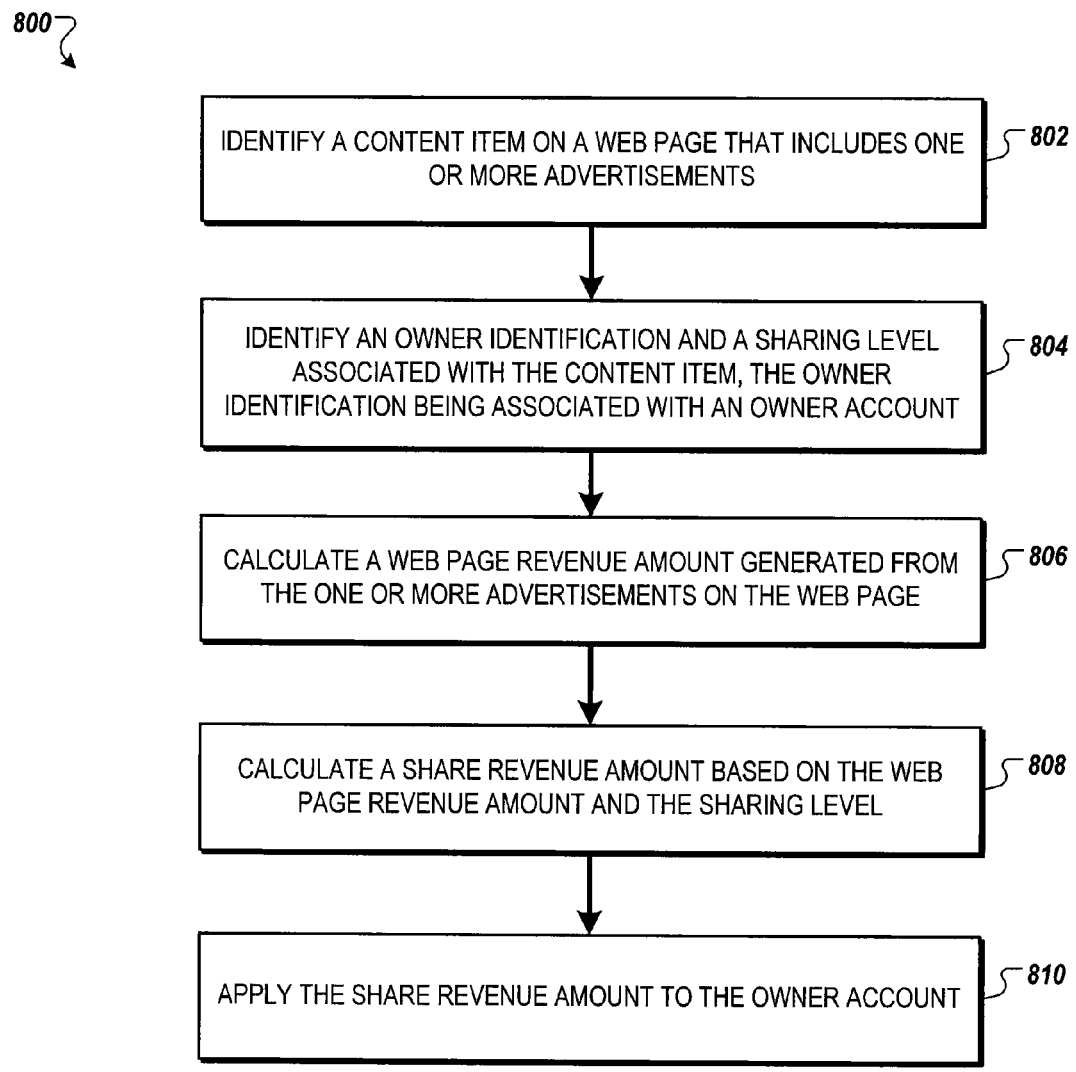
FIG. 8 is a flowchart of an example process for calculating revenue share from use of a tagged content item.

FIG. 8 is a flowchart of an example process 800 for calculating revenue share from use of a tagged content item. The process 800 can be implemented in the tracking system 640 of FIG. 6, for example.

A content item is identified as being on a web page that also includes one or more advertisements (802). For example, the access engine 640 can identify the content item on a web page that also includes one or more advertisements.

An owner identification and a sharing level associated with the content item then are identified, with the owner identification being associated with an owner account (804). For example, the access engine 640 can identify an owner identification and a sharing level associated with the content item.

A web page revenue amount generated from the one or more advertisements on the web page is calculated (806). For example, the billing engine 642 can calculate a web page revenue amount generated from the one or more advertisements on the web page.

Using the web page revenue amount, a share revenue amount based on the web page revenue amount and the sharing level is calculated (808). For example, the billing engine 642 can calculate a share revenue amount based on the web page revenue amount and the sharing level.

The share revenue amount is applied to the owner account (810). For example, the billing engine 642 can apply the share revenue amount to the owner account.

Figure 9:
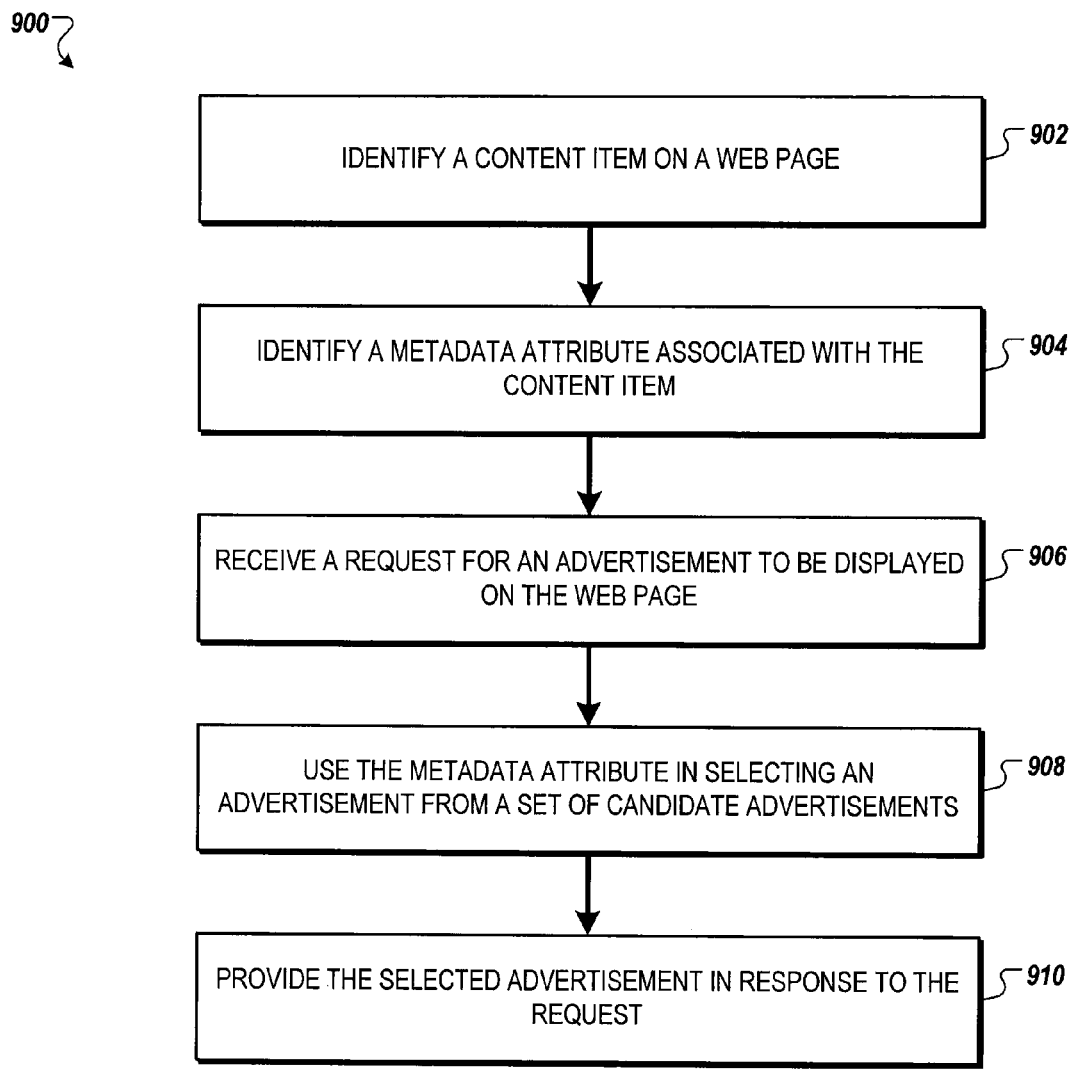
FIG. 9 is a flowchart of an example process for providing advertisements.

FIG. 9 is a flowchart of an example process 900 for providing advertisements. The process 900 can be implemented in the tracking system 640 of FIG. 6, for example.

A content item on a web page is identified (902). For example, the access engine 640 can identify a content item on a web page.

A metadata attribute associated with the content item is also identified (904). For example, the access engine 640 can identify a metadata attribute associated with the content item.

A request for an advertisement to be displayed on the web page is received (906). For example, the access engine 640 can receive a request for an advertisement to be displayed on the web page.

Using the metadata attribute, an advertisement is selected from a set of candidate advertisements (908). For example, the access engine 640 can use the metadata attribute in selecting an advertisement from a set of candidate advertisements.

The selected advertisement is provided in response to the request (910). For example, the access engine 640 can provide the selected advertisement in response to the request.

Figure 10:
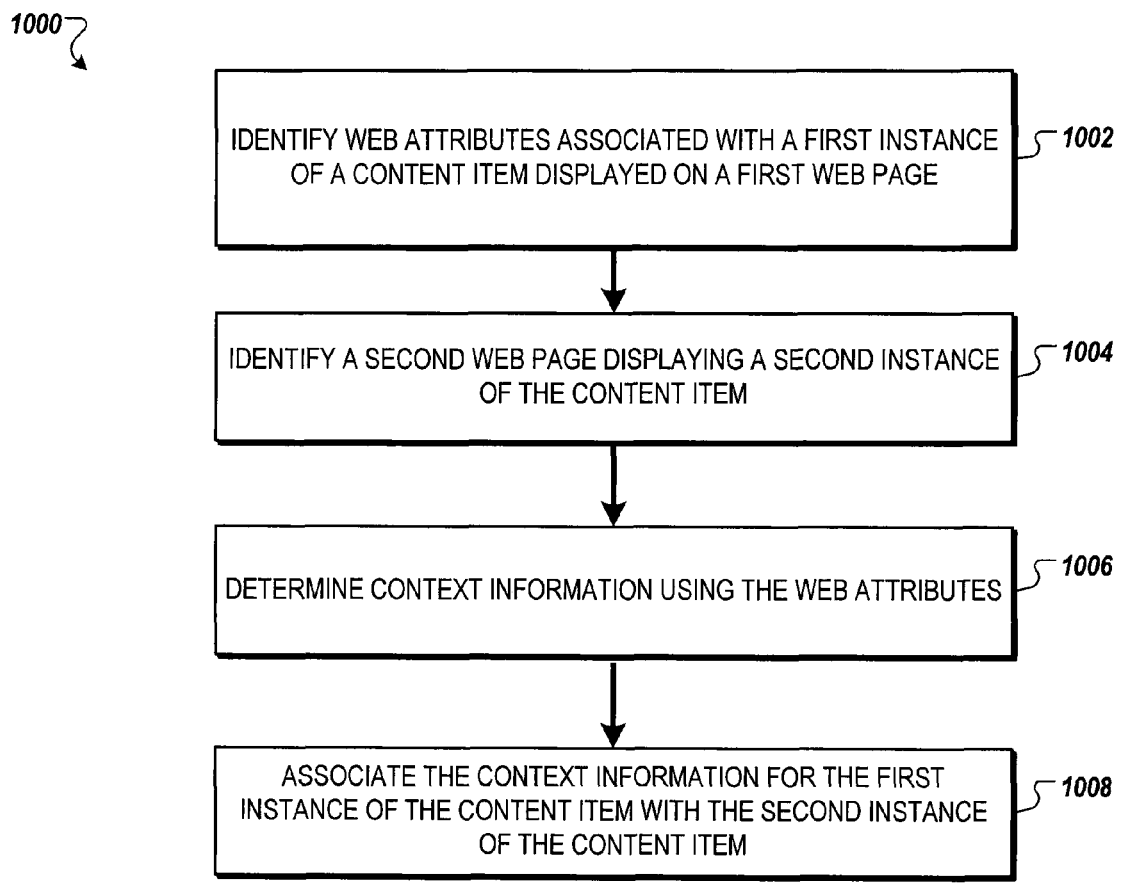
FIG. 10 is a flowchart of an example process for associating context information with content items.

FIG. 10 is a flowchart of an example process 1000 for associating context information with content items. The process 1000 can be implemented in the tracking system 640 of FIG. 6, for example.

Web attributes associated with a first instance of a content item displayed on a first web page are identified (1002). For example, the access engine 640 can identify web attributes associated with a first instance of a content item displayed on a first web page.

A second web page displaying a second instance of the content item is also identified (1004). For example, the access engine 640 can identify a second web page displaying a second instance of the content item.

Context information is determined using the web attributes (1006). For example, the access engine 640 can determine context information using the web attributes.

The context information is associated with the second web page (1008). For example, the access engine 640 can associate the context information with the second web page.

Figure 11:
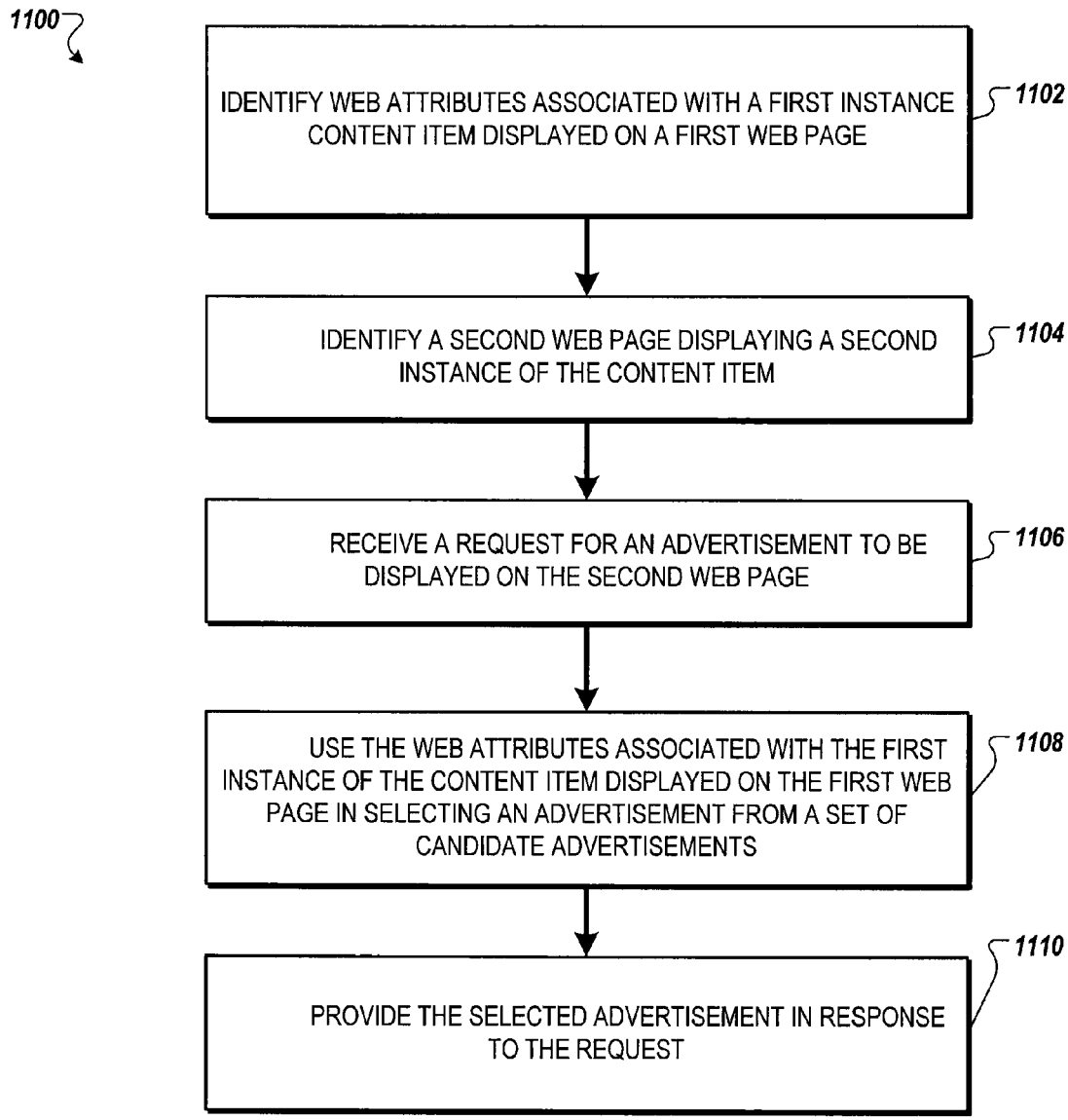
FIG. 11 is a flowchart of another example process for providing advertisements.

FIG. 11 is a flowchart of an example process 1100 for providing advertisements. The process 1100 can be implemented in the tracking system 640 of FIG. 6, for example.

Web attributes associated with a first instance content item displayed on a first web page are identified (1102). For example, the access engine 640 can identify web attributes associated with a first instance content item displayed on a first web page.

A second web page displaying a second instance of the content item is identified (1104). For example, the access engine 640 can identify a second web page displaying a second instance of the content item.

A request for an advertisement to be displayed on the second web page is received (1106). For example, the access engine 640 can receive a request for an advertisement to be displayed on the second web page.

The web attributes associated with the first instance of the content item displayed on the first web page are used in selecting an advertisement from a set of candidate advertisements (1108). For example, the access engine 640 can use the web attributes associated with the first instance of the content item displayed on the first web page in selecting an advertisement from a set of candidate advertisements.

The selected advertisement is provided in response to the request (1110). For example, the access engine 640 can provide the selected advertisement in response to the request.

The described subject matter can be implemented in digital electronic circuitry, or in computer software, firmware, or hardware, including the structures disclosed in this specification and their structural equivalents, or in combinations of one or more of them. The described subject matter also can be implemented as one or more computer program products, i.e., one or more modules of computer program instructions encoded on a tangible program carrier for execution by, or to control the operation of, data processing apparatus. The tangible program carrier can be a computer-readable medium that can be a machine-readable storage device, a machine-readable storage substrate, a random or serial access memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The described subject matter can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations. Certain features that are described in this specification in the context of separate implementations can also be implemented in combination in a single implementation. Conversely, various features that are described in the context of a single implementations can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all embodiments, and it should be understood that the described program components and systems can generally be integrated together in a single software product or packaged into multiple software products.

Particular implementations have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   identifying, by one or more computers, a first content item on a web page, the web page having one or more additional content items separate from the first content item;
      wherein, the first content item and the one or more additional content items each contain metadata attributes comprising metadata keywords and one or more other attributes, wherein the metadata attributes are selected from a group comprising date and time information, camera settings, sharing level information, ownership information, or cost-per-use information;
   receiving, by one or more computers, a request for an advertisement to be displayed on the web page;
   identifying, by one or more computers, metadata attributes associated with the first content item and the one or more additional content items on the web page;
   selecting by one or more computers, as candidate advertisements, one or more advertisements that include at least one advertisement keyword that matches any of the metadata attributes;
   ranking, by one or more computers, the candidate advertisements, based on a number of matching advertisement keywords and metadata attributes; and
   providing, by one or more computers, at least one of the candidate advertisements in response to the request based on the ranking.

2. The method of claim 1, wherein the metadata attributes associated with the one or more content items are not used in determining candidate advertisements if the metadata attributes of the one or more content items indicates that use is not permitted.

3. The method of claim 1, wherein the web page does not include text.

4. The method of claim 1, wherein the one or more additional content items include at least a URL associated with the web page, content associated with the web page, and subject matter associated with the web page.

5. The method of claim 1, further comprising displaying at least one of the candidate advertisements on the web page.

6. The method of claim 1, wherein at least one of the candidate advertisements is provided to a publisher associated with the web page.

7. The method of claim 1, wherein creatives of the candidate advertisements are compared with the metadata attributes to determine whether words in the creatives match metadata attributes.

8. The method of claim 1, wherein selecting comprises:
   identifying advertisement keywords associated with a set of advertisements; and
   selecting, as candidate advertisements, advertisements, from the set of advertisements, that are associated with advertisement keywords that match the metadata attributes.

9. The method of claim 8, further comprising:
   ranking the candidate advertisements based on a number of matching metadata attributes and advertisement keywords associated with each candidate advertisement; and
   using the ranking in selecting an advertisement from the candidate advertisements.

10. A system comprising:
    one or more computers; and
    computer memory having instructions stored thereon which, when executed by the one or more computers, cause the one or more computers to perform operations comprising:
    identifying a first content item on a web page, the web page having one or more additional content items separate from the first content item;
       wherein, the first content item and the one or more additional content items each contain metadata attributes comprising keywords and one or more other attributes, wherein the metadata attributes are selected from a group comprising date and time information, camera settings, ownership information, sharing level information, or cost-per-use information;
    receiving a request for an advertisement to be displayed on the web page;
    identifying metadata attributes associated with the first content item and the one or more additional content items on the web page;
    selecting, as candidate advertisements, one or more advertisements that include at least one advertisement keyword that matches any of the metadata attributes;
    ranking the candidate advertisements based on a number of matching advertisement keywords and metadata attributes; and
    providing at least one of the candidate advertisements in response to the request based on the ranking.

11. The system of claim 10, wherein the metadata attributes associated with the one or more content items are not used in determining candidate advertisements if the metadata attributes of the one or more content items indicates that use is not permitted.

12. The system of claim 10, wherein the web page does not include text.

13. The system of claim 10, wherein the additional content items include at least a URL associated with the web page, content associated with the web page, and subject matter associated with the web page.

14. One or more non-transitory machine-readable media storing instructions that when executed by one or more data processing apparatus cause the one or more data processing apparatus to perform operations comprising:
    identifying a first content item on a web page, the web page having one or more additional content items separate from the first content item;
       wherein, the first content item and the one or more additional content items each contain metadata attributes comprising keywords and one or more other attributes, wherein the metadata attributes are selected from a group comprising date and time information, camera settings, ownership information, sharing level information, or cost-per-use information;

receiving a request for an advertisement to be displayed on the web page;

identifying metadata attributes associated with the first content item and the one or more additional content items on the web page;

selecting, as candidate advertisements, one or more advertisements that include at least one advertisement keyword that matches any of the metadata attributes;

ranking the candidate advertisements, based on a number of matching advertisement keywords and metadata attributes; and providing at least one of the candidate advertisements in response to the request based on the ranking.

15. The one or more non-transitory machine-readable media of claim 14, wherein the operations further comprise displaying at least one of the candidate advertisements on the web page.

16. The one or more non-transitory machine-readable media of claim 14, wherein the operations further comprise providing at least one of the candidate advertisements to a publisher associated with the web page.

17. The one or more non-transitory machine-readable media of claim 14, wherein the web page does not include text.

18. The one or more non-transitory machine-readable media of claim 14, wherein selecting comprises:
   identifying advertisement keywords associated with a set of advertisements; and
   selecting, as candidate advertisements, advertisements, from the set of advertisements, that are associated with advertisement keywords that match the metadata attributes.

19. The one or more non-transitory machine-readable media of claim 18, wherein the operations further comprise:
   ranking the candidate advertisements based on a number of matching metadata attributes and advertisement keywords associated with each candidate advertisement; and
   using the ranking in selecting an advertisement from the set of candidate advertisements.

* * * * *